US012753780B2

(12) United States Patent
Quan et al.

(10) Patent No.: US 12,753,780 B2
(45) Date of Patent: Oct. 6, 2026

(54) CONTROL METHOD BASED ON A FOUR-CHAMBER HYDRAULIC CYLINDER

(71) Applicant: Taiyuan University of Technology, Taiyuan (CN)

(72) Inventors: Long Quan, Taiyuan (CN); Tao Liang, Taiyuan (CN); Lianpeng Xia, Taiyuan (CN); Xiangyu Wang, Taiyuan (CN); Lei Ge, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 56 days.

(21) Appl. No.: 19/173,869

(22) Filed: Apr. 9, 2025

(65) Prior Publication Data

US 2026/0049622 A1 Feb. 19, 2026

(30) Foreign Application Priority Data

Aug. 14, 2024 (CN) .......................... 202411111349.2

(51) Int. Cl.
*F15B 11/036* (2006.01)
*F15B 7/00* (2006.01)
(Continued)

(52) U.S. Cl.
CPC ............ *F15B 11/036* (2013.01); *F15B 7/006* (2013.01); *F15B 9/04* (2013.01); *F15B 9/09* (2013.01);
(Continued)

(58) Field of Classification Search
CPC ..... F15B 11/036; F15B 11/08; F15B 11/0426; F15B 15/1466; F15B 2211/20515; F15B 2211/20546; F15B 2211/20569; F15B 2211/20576; F15B 2211/26; F15B 2211/265; F15B 2211/30525; F15B 2211/30565; F15B 2211/3111; F15B 2211/3144; F15B 2211/6052; F15B 2211/61; F15B 2211/6309; F15B 7/006; F15B 9/04; F15B 9/09; F15B 11/17; F15B 21/14; F15B 2211/20538; F15B 2211/20561; F15B 2211/20584; F15B 2211/212; F15B 2211/2658; F15B 2211/27; F15B 2211/3057; F15B 2211/30575;
(Continued)

(56) References Cited

U.S. PATENT DOCUMENTS 9,580,282 B2 * 2/2017 Leinonen ................ B66C 23/54
9,903,394 B2 * 2/2018 Brahmer ............... F15B 13/042
(Continued)

*Primary Examiner* — Dustin T Nguyen
(74) *Attorney, Agent, or Firm* — Bayramoglu Law Offices LLC

(57) ABSTRACT

An open and closed circuit parallel drive system and a control method based on a four-chamber hydraulic cylinder are provided. The system includes: a closed pump-controlled drive unit and an open valve-controlled drive unit. The four-chamber hydraulic cylinder is driven by the open valve-controlled drive unit with a large load power, and the operating velocity and displacement of the four-chamber hydraulic cylinder are controlled by the closed pump-controlled drive unit with a small load power, thereby improving the linearity and stability of the four-chamber hydraulic cylinder control and reducing the system installed power and throttling loss.

10 Claims, 3 Drawing Sheets

(51) Int. Cl.

| | |
|---|---|
| ***F15B 9/04*** | (2006.01) |
| ***F15B 9/09*** | (2006.01) |
| ***F15B 11/08*** | (2006.01) |
| ***F15B 11/17*** | (2006.01) |
| ***F15B 15/14*** | (2006.01) |
| ***F15B 21/14*** | (2006.01) |
| *F15B 11/042* | (2006.01) |

(52) U.S. Cl.

CPC .............. *F15B 11/08* (2013.01); *F15B 11/17* (2013.01); *F15B 15/1466* (2013.01); *F15B 21/14* (2013.01); *F15B 11/0426* (2013.01); *F15B 2211/20515* (2013.01); *F15B 2211/20538* (2013.01); *F15B 2211/20546* (2013.01); *F15B 2211/20561* (2013.01); *F15B 2211/20569* (2013.01); *F15B 2211/20576* (2013.01); *F15B 2211/20584* (2013.01); *F15B 2211/212* (2013.01); *F15B 2211/26* (2013.01); *F15B 2211/265* (2013.01); *F15B 2211/2658* (2013.01); *F15B 2211/27* (2013.01); *F15B 2211/30525* (2013.01); *F15B 2211/30565* (2013.01); *F15B 2211/3057* (2013.01); *F15B 2211/30575* (2013.01); *F15B 2211/3111* (2013.01); *F15B 2211/3144* (2013.01); *F15B 2211/327* (2013.01); *F15B 2211/5157* (2013.01); *F15B 2211/6052* (2013.01); *F15B 2211/61* (2013.01); *F15B 2211/6309* (2013.01); *F15B 2211/6313* (2013.01); *F15B 2211/633* (2013.01); *F15B 2211/6336* (2013.01); *F15B 2211/6651* (2013.01); *F15B 2211/6653* (2013.01); *F15B 2211/6654* (2013.01); *F15B 2211/6655* (2013.01); *F15B 2211/6656* (2013.01); *F15B 2211/7053* (2013.01); *F15B 2211/7055* (2013.01); *F15B 2211/75* (2013.01); *F15B 2211/76* (2013.01); *F15B 2211/7656* (2013.01); *F15B 2211/775* (2013.01)

(58) Field of Classification Search

CPC ........ F15B 2211/327; F15B 2211/5157; F15B 2211/6313; F15B 2211/633; F15B 2211/6336; F15B 2211/6651; F15B 2211/6653; F15B 2211/6655; F15B 2211/6656; F15B 2211/7055; F15B 2211/75; F15B 2211/76; F15B 2211/7656; F15B 2211/775

See application file for complete search history.

(56) References Cited

U.S. PATENT DOCUMENTS

| | | | | |
|---|---|---|---|---|
| 10,184,225 | B2 * | 1/2019 | Hiraku | F15B 11/10 |
| 10,302,101 | B2 * | 5/2019 | Schaber | F15B 13/0401 |
| 10,323,657 | B2 * | 6/2019 | Schulz | F15B 3/00 |
| 10,704,569 | B2 * | 7/2020 | Sipola | F15B 11/036 |
| 10,829,908 | B2 * | 11/2020 | Saitoh | E02F 9/2235 |
| 11,035,391 | B2 * | 6/2021 | Wellenberg | F15B 15/18 |
| 11,512,716 | B2 * | 11/2022 | Gerngross | F15B 7/006 |
| 11,603,867 | B2 * | 3/2023 | Dany | F15B 11/17 |
| 11,746,801 | B2 * | 9/2023 | Sahlman | F15B 1/265<br>60/477 |
| 12,146,294 | B2 * | 11/2024 | Sahlman | E02F 9/2203 |
| 12,292,062 | B2 * | 5/2025 | Bertolin | F15B 11/036 |
| 2008/0155975 | A1 * | 7/2008 | Brinkman | F15B 11/036<br>60/327 |

* cited by examiner

CONTROL METHOD BASED ON A FOUR-CHAMBER HYDRAULIC CYLINDER

CROSS REFERENCE TO THE RELATED APPLICATIONS

This application is based upon and claims priority to Chinese Patent Application No. 202411111349.2, filed on Aug. 14, 2024, the entire contents of which are incorporated herein by reference.

TECHNICAL FIELD

The present application relates to the field of hydraulic control, and in particular to an open and closed circuit parallel drive system and control method based on a four-chamber hydraulic cylinder.

BACKGROUND

Hydraulic cylinder control systems play a vital role in fields such as engineering machinery, agricultural machinery, aerospace, and industrial production, in which the open valve-controlled hydraulic cylinder control systems feature fast dynamic response and high power density, making them the most widely used hydraulic cylinder drive and control methods. However, during the operation of such systems, not only do they produce severe throttling losses at the hydraulic control valve port, resulting in low system energy efficiency; in addition, due to the pressure-flow control characteristics of the hydraulic control valve itself, the system has strong nonlinearity and is difficult to control.

The closed pump-controlled hydraulic cylinder control system uses a volume direct drive method to control the hydraulic cylinder, which completely eliminates throttling losses, can greatly improve the system energy efficiency, and effectively improve the control characteristics of the system. The Chinese patent with publication number CN110307195A discloses a hydraulic bending machine electro-hydraulic control system with a closed pump-controlled asymmetric cylinder, which employs a servo motor to drive a bidirectional quantitative pump to directly control the two chambers of the single-rod hydraulic cylinder. However, an additional oil replenishment device is required to compensate for the asymmetric flow during the operation of the single-rod hydraulic cylinder, which results a relatively complex system. The Chinese patent with publication number CN108412825A discloses a closed variable velocity pump-controlled hydraulic system equipped on a pure electric compression garbage truck, which employs a set of electric motor/generator driven quantitative hydraulic pump/motor to control different hydraulic actuators, and under negative load conditions, the hydraulic pump/motor drives the electric motor/generator to convert the actuator potential energy into electrical energy for recovery, which can reduce the system energy consumption. However, the power of the electric motor/generator must match the peak power of each actuator, which greatly increases the installed power and cost of the electric motor/generator.

SUMMARY

The object of the present application is to provide an open and closed circuit parallel drive system and control method based on a four-chamber hydraulic cylinder. The four-chamber hydraulic cylinder is driven by an open valve-controlled drive unit with a large load power, and the operating velocity and displacement of the four-chamber hydraulic cylinder are controlled by a closed pump-controlled drive unit with a small load power. The linearity and stability of the four-chamber hydraulic cylinder control can be improved, and the system installed power and the throttling loss can be reduced.

To achieve the above object, the present application provides the following solutions:

An open and closed circuit parallel drive system based on a four-chamber hydraulic cylinder, including a four-chamber hydraulic cylinder and a hydraulic control system, wherein the system includes:

a closed pump-controlled drive unit and an open valve-controlled drive unit;

the first oil port of the closed pump-controlled drive unit is connected to the oil port B of the four-chamber hydraulic cylinder, and the second oil port of the closed pump-controlled drive unit is connected to the oil port A of the four-chamber hydraulic cylinder; the closed pump-controlled drive unit is used to drive and control the operating velocity and displacement of the four-chamber hydraulic cylinder with a first load power;

the first oil port of the open valve-controlled drive unit is connected to the oil port D of the four-chamber hydraulic cylinder, and the second oil port of the open valve-controlled drive unit is connected to the oil port C of the four-chamber hydraulic cylinder; the open valve-controlled drive unit is used to drive the four-chamber hydraulic cylinder with a second load power; the second load power is greater than the first load power.

Alternatively, the closed pump-controlled drive unit specifically includes: a second power source, a second hydraulic pump motor, an oil source, a first check valve, a second check valve, a first relief valve and a second relief valve;

the oil outlet of the first check valve is connected to the oil port B of the four-chamber hydraulic cylinder and the first oil port of the second hydraulic pump motor respectively, and the oil inlet of the first check valve is connected to the oil source and the oil inlet of the second check valve respectively;

the oil outlet of the second check valve is connected to the oil port A of the four-chamber hydraulic cylinder and the second oil port of the second hydraulic pump motor respectively;

the second hydraulic pump motor is connected to the shaft of the second power source;

the oil inlet of the first relief valve is connected to the oil port B of the four-chamber hydraulic cylinder, and the oil outlet of the first relief valve is connected to the oil outlet of the second relief valve and the oil source respectively;

the oil inlet of the second relief valve is connected to the oil port A of the four-chamber hydraulic cylinder.

Alternatively, the closed pump-controlled drive unit further includes: a fourth pressure sensor and a fifth pressure sensor;

the detection end of the fourth pressure sensor is disposed on the oil circuit where the oil outlet of the first check valve is located;

the detection end of the fifth pressure sensor is disposed on the oil circuit where the oil outlet of the second check valve is located.

Alternatively, the open valve-controlled drive unit specifically includes:

a valve-controlled module and a driving module;

the first oil port of the valve-controlled module is connected to the oil port D of the four-chamber hydraulic cylinder, and the second oil port of the valve-controlled module is connected to the oil port C of the four-chamber hydraulic cylinder;

the oil outlet of the driving module is connected to the oil inlet of the valve-controlled module.

Alternatively, the driving module specifically includes: a first power source, a first hydraulic pump motor, a third relief valve, an oil reservoir and a first pressure sensor;

the first hydraulic pump motor is connected to the shaft of the first power source;

the first oil port of the first hydraulic pump motor is connected to the oil reservoir, and the second oil port of the first hydraulic pump motor is connected to the oil inlet of the valve-controlled module;

the oil reservoir is connected to the oil return port of the valve-controlled module;

the oil outlet of the third relief valve is connected to the oil reservoir;

the oil inlet of the third relief valve is connected to the second oil port of the first hydraulic pump motor;

the detection end of the first pressure sensor is disposed on the oil circuit where the third oil port of the valve-controlled module is located.

Alternatively, the valve-controlled module at least includes: a three-position four-way proportional valve and a first hydraulic accumulator;

the first oil port of the three-position four-way proportional valve is connected to the oil port D of the four-chamber hydraulic cylinder;

the second oil port of the three-position four-way proportional valve is connected to the oil port C of the four-chamber hydraulic cylinder;

the third oil port of the three-position four-way proportional valve is connected to the oil outlet of the driving module;

the fourth oil port of the three-position four-way proportional valve is connected to the oil reservoir;

the first hydraulic accumulator is disposed between the third oil port of the three-position four-way proportional valve and the oil outlet of the driving module.

Alternatively, the valve-controlled module specifically includes: a first three-position three-way proportional valve and a second three-position three-way proportional valve;

the first oil port of the first three-position three-way proportional valve is connected to the oil port D of the four-chamber hydraulic cylinder;

the first oil port of the second three-position three-way proportional valve is connected to the oil port C of the four-chamber hydraulic cylinder;

the second oil port of the first three-position three-way proportional valve and the second oil port of the second three-position three-way proportional valve are both connected to the oil outlet of the driving module;

the third oil port of the first three-position three-way proportional valve and the third oil port of the second three-position three-way proportional valve are both connected to the oil reservoir.

Alternatively, the valve-controlled module specifically includes: a reversing valve, a first proportional throttle valve, a second proportional throttle valve, a third proportional throttle valve, a fourth proportional throttle valve, a fifth proportional throttle valve, a sixth proportional throttle valve, a first hydraulic accumulator and a second hydraulic accumulator;

the first oil port of the reversing valve is connected to the oil outlet of the driving module, the second oil port of the reversing valve is connected to the oil port of the second hydraulic accumulator, the first oil port of the first proportional throttle valve and the first oil port of the fourth proportional throttle valve respectively, and the third oil port of the reversing valve is connected to the oil port of the first hydraulic accumulator, the first oil port of the second proportional throttle valve and the first oil port of the fifth proportional throttle valve respectively; the pressure of the second hydraulic accumulator is greater than the pressure of the first hydraulic accumulator;

the first oil port of the third proportional throttle valve and the first oil port of the sixth proportional throttle valve are both connected to the oil reservoir; the second oil port of the third proportional throttle valve is connected to the oil port D of the four-chamber hydraulic cylinder, the second oil port of the first proportional throttle valve and the second oil port of the second proportional throttle valve respectively;

the second oil port of the sixth proportional throttle valve is connected to the oil port C of the four-chamber hydraulic cylinder, the second oil port of the fourth proportional throttle valve and the second oil port of the fifth proportional throttle valve respectively.

Alternatively, the second hydraulic pump motor is a fixed-displacement closed hydraulic pump motor or a variable-displacement closed hydraulic pump motor; the second power source is a servo motor, a stepper motor, a DC motor or a switched reluctance motor; the first hydraulic pump motor is a constant pressure pump, a load-sensitive pump, a constant-power variable pump or an electric proportional displacement pump; the first power source is an electric motor, a diesel engine or a gasoline engine.

A control method for an open and closed circuit parallel drive system based on a four-chamber hydraulic cylinder, wherein, the method utilizes the above mentioned system, and the method includes:

providing a first load power and controlling the operating velocity and displacement of the four-chamber hydraulic cylinder through the closed pump-controlled drive unit;

providing a second load power through the open valve-controlled drive unit;

the second load power is greater than the first load power;

the specific method for controlling the operating velocity and displacement of the four-chamber hydraulic cylinder is as follows:

when the four-chamber hydraulic cylinder overcomes the external load and extends, based on a preset velocity and displacement, adjusting the rotation velocity of the second power source by an open-circuit or closed-circuit control manner to control the velocity and displacement of the four-chamber hydraulic cylinder; adjusting the pressure of the third chamber of the four-chamber hydraulic cylinder through the valve-controlled module of the open valve-controlled drive unit to prevent the second power source from being overloaded;

when the four-chamber hydraulic cylinder overcomes the external load and retracts, based on a preset velocity and displacement, adjusting the velocity of the second power source by an open-circuit or closed-circuit control manner to control the velocity and displacement of the four-chamber hydraulic cylinder; adjusting the pressure of the fourth chamber of the four-chamber hydraulic cylinder by the valve-controlled module of the open valve-controlled drive unit to prevent the second power source from being overloaded;

when the four-chamber hydraulic cylinder extends under the action of an external load, based on a preset velocity and displacement, controlling the velocity and displacement of the four-chamber hydraulic cylinder by adjusting the rotation velocity of the second power source; the second power source is in a power generation state, converting the kinetic and potential energy of the four-chamber hydraulic cylinder into electrical energy for recovery; adjusting the pressure of the fourth chamber of the four-chamber hydraulic cylinder by the valve-controlled module of the open valve-controlled drive unit to prevent the second power source from overloading;

when the four-chamber hydraulic cylinder retracts under the action of an external load, based on the preset velocity and displacement, controlling the velocity and displacement of the four-chamber hydraulic cylinder by adjusting the rotation velocity of the second power source; the second power source is in a power generation state, converting the kinetic and potential energy of the four-chamber hydraulic cylinder into electrical energy for recovery; adjusting the pressure of the third chamber of the four-chamber hydraulic cylinder by the valve-controlled module of the open valve-controlled drive unit to prevent the second power source from overloading;

the working torque of the second power source is less than or equal to the rated torque.

According to the specific embodiments provided by the present application, the present application discloses the following beneficial technical effects:

The present application drives the four-chamber hydraulic cylinder with a large load power through an open valve-controlled drive unit, and drives and controls the operating velocity and displacement of the four-chamber hydraulic cylinder with a small load power through a closed pump-controlled drive unit, thereby improving the linearity and stability of the four-chamber hydraulic cylinder control and reducing the system installed power and throttling loss. The present application uses an open valve-controlled drive unit and a closed pump-controlled drive unit to drive a high-power load in parallel, which can achieve the decoupling of the actuator motion control and power output. The open valve-controlled drive unit matches the external load acting on the actuator in real time, reducing the throttling loss of the system, and suppressing the interference of the external load on the closed pump-controlled system meanwhile, so that the drive system has higher motion control accuracy and operating stability.

BRIEF DESCRIPTION OF THE DRAWINGS

In order to more clearly illustrate the technical solutions of the embodiments of the present application or the prior art, the drawings required for use in the embodiments will be briefly introduced below. Obviously, the drawings described below are only some embodiments of the present application. For ordinary technicians in this field, other drawings can be obtained based on these drawings without paying creative labor.

EXPLANATION OF REFERENCE NUMBERS

Figure 1:
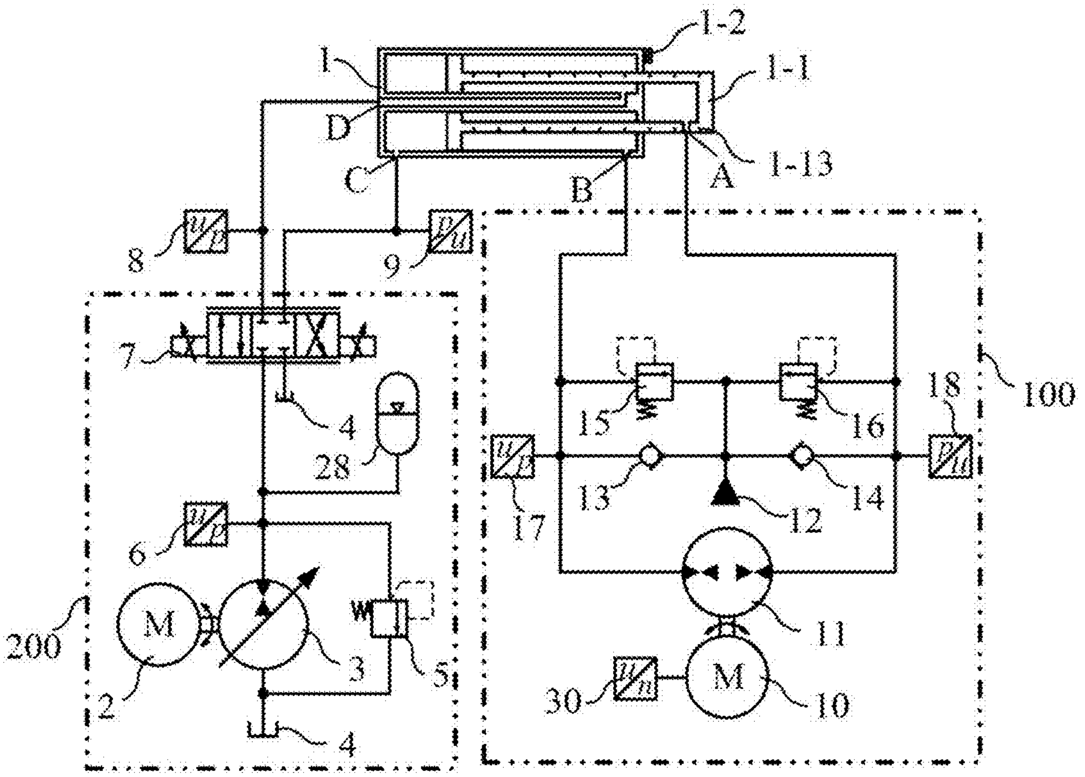
FIG. 1 is a first structural connection diagram of an open and closed circuit parallel drive system based on a four-chamber hydraulic cylinder according to an embodiment of the present application.

1. four-chamber hydraulic cylinder; 1-1. piston rod; 1-2. position sensing device; 1-3. cylinder body; 1-4. hollow plunger rod; 1-5. first chamber; 1-6. second chamber; 1-7. third chamber; 1-8. fourth chamber; 1-9. magnetoelectric induction mark point; 2. first power source; 3. first hydraulic pump motor; 4. oil reservoir; 5. third relief valve; 6. first pressure sensor; 7. three-position four-way proportional valve; 8. second pressure sensor; 9. third pressure sensor; 10. second power source; 11. second hydraulic pump motor; 12. oil source; 13. first check valve; 14. second non-return valve; 15. first relief valve; 16, second relief valve; 17. fourth pressure sensor; 18. fifth pressure sensor; 19. first three-position three-way proportional valve; 20. second three-position three-way proportional valve; 21. reversing valve; 22. first proportional throttle valve; 23. second proportional throttle valve; 24. third proportional throttle valve; 25. fourth proportional throttle valve; 26. fifth proportional throttle valve; 27. sixth proportional throttle valve; 28. first hydraulic accumulator; 29. second hydraulic accumulator; 30. rotational velocity sensor; 100. closed pump-controlled drive unit; 200. open valve-controlled drive unit.

DETAILED DESCRIPTION OF THE EMBODIMENTS

With reference to the drawings according to the embodiments of the present application, the following will clearly and completely describe the technical solutions according to the embodiments of the present application. Obviously, the described embodiments are only part of the embodiments of the present application, not all of them. Based on the embodiments of the present application, all other embodiments obtained by ordinary technicians in this field without creative work are within the scope of protection of the present application.

In the prior art, the open valve-controlled hydraulic cylinder control system has large throttling losses and low system energy efficiency during velocity and position control; and the system is highly nonlinear, which increases the difficulty of control. In the existing pump-controlled single-rod hydraulic cylinder drive system, each actuator must be equipped with a separate power source, and each power source must match the peak power of each actuator, which greatly increases the torque and installed power of the power source.

The objects of the present application is to provide an open and closed circuit parallel drive system and control method based on a four-chamber hydraulic cylinder, wherein the four-chamber hydraulic cylinder is driven and controlled by an open valve-controlled drive unit with a large load power, and the operating velocity and displacement of the four-chamber hydraulic cylinder are controlled by a closed pump-controlled drive unit with a small load power, thereby improving the linearity and stability of the four-chamber hydraulic cylinder control and reducing the system installed power and throttling loss.

In order to make the above-mentioned objects, features and advantages of the present application more obvious and easier to understand, the present application is further described in detail below with reference to the accompanying drawings and specific embodiments.

In the prior art, the open valve-controlled hydraulic cylinder control system has large throttling losses and low system energy efficiency during velocity and position control; and the system is highly nonlinear, which increases the difficulty of control. In the existing pump-controlled single-rod hydraulic cylinder drive system, each actuator must be equipped with a separate power source, and each power source must match the peak power of each actuator, which greatly increases the torque and installed power of the power source.

Embodiment 1

As shown in FIG. 1, the present application provides an open and closed circuit parallel drive system based on a four-chamber hydraulic cylinder, the system including a four-chamber hydraulic cylinder and a hydraulic control system. The system includes:

a closed pump-controlled drive unit 100 and an open valve-controlled drive unit 200.

The first oil port of the closed pump-controlled drive unit 100 is connected to the oil port B of the four-chamber hydraulic cylinder 1, and the second oil port of the closed pump-controlled drive unit 100 is connected to the oil port A of the four-chamber hydraulic cylinder 1; the closed pump-controlled drive unit 100 is used to drive and control the operating velocity and displacement of the four-chamber hydraulic cylinder 1 with a first load power.

The first oil port of the open valve-controlled drive unit 200 is connected to the oil port D of the four-chamber hydraulic cylinder 1, and the second oil port of the open valve-controlled drive unit 200 is connected to the oil port C of the four-chamber hydraulic cylinder 1; the open valve-controlled drive unit 200 is used to drive the four-chamber hydraulic cylinder 1 with a second load power; the second load power is greater than the first load power.

Figure 4:
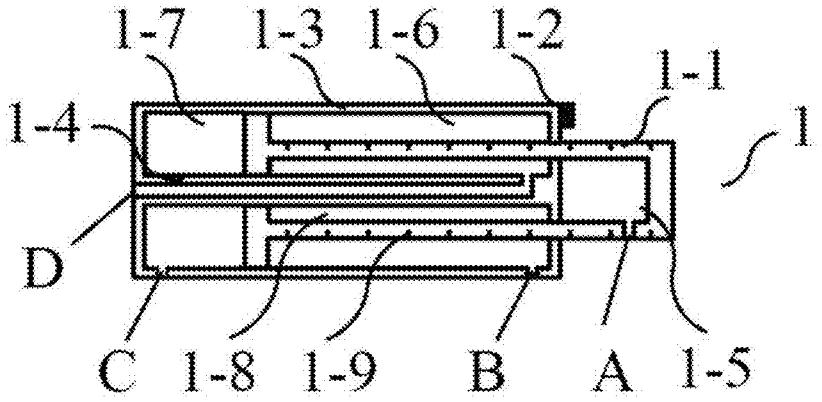
FIG. 4 is a structural diagram of a four-chamber hydraulic cylinder according to an embodiment of the present application.

As shown in FIG. 4, the four-chamber hydraulic cylinder 1 includes a cylinder body 1-3, a piston rod 1-1, and a hollow plunger rod 1-4. The inner wall of the piston rod 1-1 and the outer wall of the cylinder body 1-3 form a first chamber 1-5, and the corresponding working oil port is oil port A; the outer wall of the piston rod 1-1 and the inner wall of the cylinder body 1-3 form a second chamber 1-6, and the corresponding working oil port is oil port B; the outer wall of the hollow plunger rod 1-4 and the inner wall of the cylinder body 1-3 form a third chamber 1-7, and the corresponding working oil port is oil port C; the inner wall of the piston rod 1-1 and the outer wall of the hollow plunger rod 1-4 forms a fourth chamber 1-8, and the corresponding working oil port is the oil port D; in order to further improve the velocity and position control accuracy of the four-chamber hydraulic cylinder 1, it further includes a position sensing device 1-2 and a series of position detection points; wherein the position sensing device 1-2 is attached to the outer wall of the cylinder body 1-3 of the four-chamber hydraulic cylinder 1; the piston rod 1-1 has annular grooves machined on it, the annular grooves are filled with non-magnetic material to form a magneto-electric induction marking point 1-9, and the surface of the piston rod 1-1 is re-machined to a specified flatness. The position sensing device 1-2 is a magnetoelectric sensor such as a Hall sensor, an eddy current sensor, magnetoresistive sensor, and other forms etc; the effective action area of the first chamber 1-5 and the second chamber 1-6 is the same; the oil port A of the four-chamber hydraulic cylinder is the oil port of the first chamber of the four-chamber hydraulic cylinder; the oil port B of the four-chamber hydraulic cylinder is the oil port of the second chamber of the four-chamber hydraulic cylinder; the oil port C of the four-chamber hydraulic cylinder is the oil port of the third chamber of the four-chamber hydraulic cylinder; the oil port D of the four-chamber hydraulic cylinder is the oil port of the fourth chamber of the four-chamber hydraulic cylinder.

As an alternative embodiment, the closed pump-controlled drive unit 100 specifically includes: a second power source 10, a second hydraulic pump motor 11, an oil source 12, a first check valve 13, a second check valve 14, a first relief valve 15 and a second relief valve 16.

The oil outlet of the first check valve 13 is connected to the oil port B of the four-chamber hydraulic cylinder 1 and the first oil port of the second hydraulic pump motor 11 respectively, and the oil inlet of the first check valve 13 is connected to the oil source 12 and the oil inlet of the second check valve 14 respectively. The second hydraulic pump motor 11 is a fixed displacement closed hydraulic pump motor or a variable displacement closed hydraulic pump motor. The oil source 12 is a low-pressure oil source.

The oil outlet of the second check valve 14 is connected to the oil port A of the four-chamber hydraulic cylinder 1 and the second oil port of the second hydraulic pump motor 11 respectively.

The second hydraulic pump motor 11 is connected to the second power source 10. The second power source 10 may be a servo motor, a stepper motor, a DC motor or a switched reluctance motor. The first hydraulic pump motor 3 may be a constant pressure pump, a load sensitive pump, a constant power variable pump or an electric proportional displacement pump; the first power source 2 may be an electric motor, a diesel engine or a gasoline engine.

The oil inlet of the first relief valve 15 is connected to the oil port B of the four-chamber hydraulic cylinder 1, and the oil outlet of the first relief valve 15 is respectively connected to the oil outlet of the second relief valve 16 and the oil source 12.

The oil inlet of the second relief valve 16 is connected to the oil port A of the four-chamber hydraulic cylinder 1.

Furthermore, the closed pump-controlled drive unit 100 also includes: the fourth pressure sensor 17 and a fifth pressure sensor 18.

Furthermore, the closed pump-controlled drive unit 100 also includes: a rotation velocity sensor 30, which is disposed on the second power source 10 and is used to detect the rotation velocity of the second power source 10.

The detection end of the fourth pressure sensor 17 is disposed on the oil circuit where the oil outlet of the first check valve 13 is located.

The detection end of the fifth pressure sensor 18 is disposed on the oil circuit where the oil outlet of the second check valve 14 is located.

The open valve-controlled driving unit 200 specifically includes:

a valve-controlled module and a driving module.

The first oil port of the valve-controlled module is connected to the oil port D of the four-chamber hydraulic cylinder 1, and the second oil port of the valve-controlled module is connected to the oil port C of the four-chamber hydraulic cylinder 1.

The oil outlet of the driving module is connected to the oil inlet of the valve-controlled module.

As an alternative embodiment, the driving module specifically includes: a first power source 2, a first hydraulic pump motor 3, a first pressure sensor 6 and an oil reservoir 4.

The first hydraulic pump motor 3 is connected to the shaft of the first power source 2; the first hydraulic pump motor 3 may be a constant pressure pump, a load sensing pump, a constant power variable pump or an electric proportional displacement pump. The first power source 2 may be an electric motor, a diesel engine or a gasoline engine.

The first oil port of the first hydraulic pump motor 3 is connected to the oil reservoir 4, and the second oil port of the first hydraulic pump motor 3 is connected to the oil inlet of the valve-controlled module.

The oil reservoir 4 is connected to the oil return port of the valve-controlled module.

Furthermore, the driving module also includes: a third relief valve 5.

The oil outlet of the third relief valve 5 is connected to the oil reservoir 4.

The oil inlet of the third relief valve 5 is connected to the second oil port of the first hydraulic pump motor 3.

The detection end of the first pressure sensor 6 is disposed on the oil circuit where the third oil port of the valve-controlled module is located.

As a first alternative embodiment, the present application proposes that when the open valve-controlled drive unit 200 is a four-side linkage valve-controlled unit, the valve-controlled module at least includes: a three-position four-way proportional valve 7 and a first hydraulic accumulator.

The first oil port of the three-position four-way proportional valve 7 is connected to the oil port D of the four-chamber hydraulic cylinder 1.

The second oil port of the three-position four-way proportional valve 7 is connected to the oil port C of the four-chamber hydraulic cylinder 1.

The third oil port of the three-position four-way proportional valve 7 is connected to the oil outlet of the driving module.

The fourth oil port of the three-position four-way proportional valve 7 is connected to the oil reservoir.

The first hydraulic accumulator 31 is disposed between the third oil port of the three-position four-way proportional valve 7 and the oil outlet of the driving module.

Figure 2:
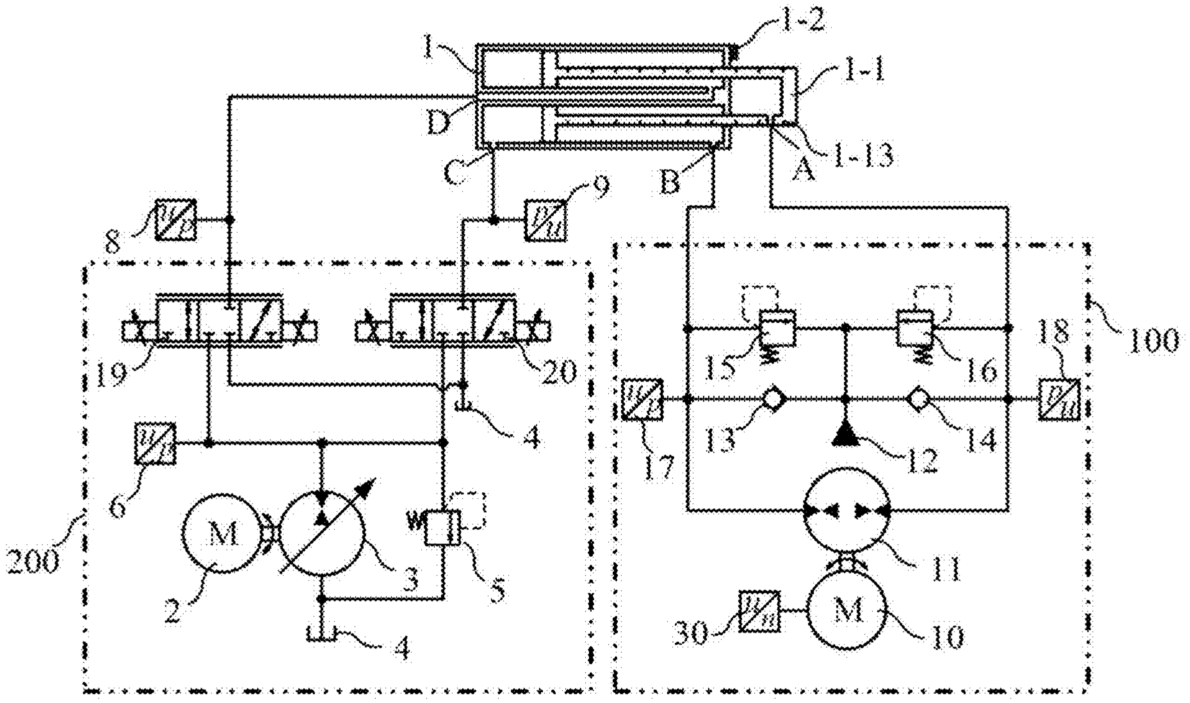
FIG. 2 is a second structural connection diagram of an open and closed circuit parallel drive system based on a four-chamber hydraulic cylinder according to an embodiment of the present application.

As a second alternative embodiment, as shown in FIG. 2, when the open valve-controlled drive unit 200 is an inlet and outlet independent valve-controlled unit, the valve-controlled module specifically includes: a first three-position three-way proportional valve 19 and a second three-position three-way proportional valve 20.

The first three-position three-way proportional valve 19 is connected to the oil port D of the four-chamber hydraulic cylinder 1.

The second three-position three-way proportional valve 20 is connected to the oil port C of the four-chamber hydraulic cylinder 1.

The second oil port of the first three-position three-way proportional valve 19 and the second oil port of the second three-position three-way proportional valve 20 are both connected to the oil outlet of the driving module.

The third oil port of the first three-position three-way proportional valve 19 and the third oil port of the second three-position three-way proportional valve 20 are both connected to the oil reservoir.

Figure 3:
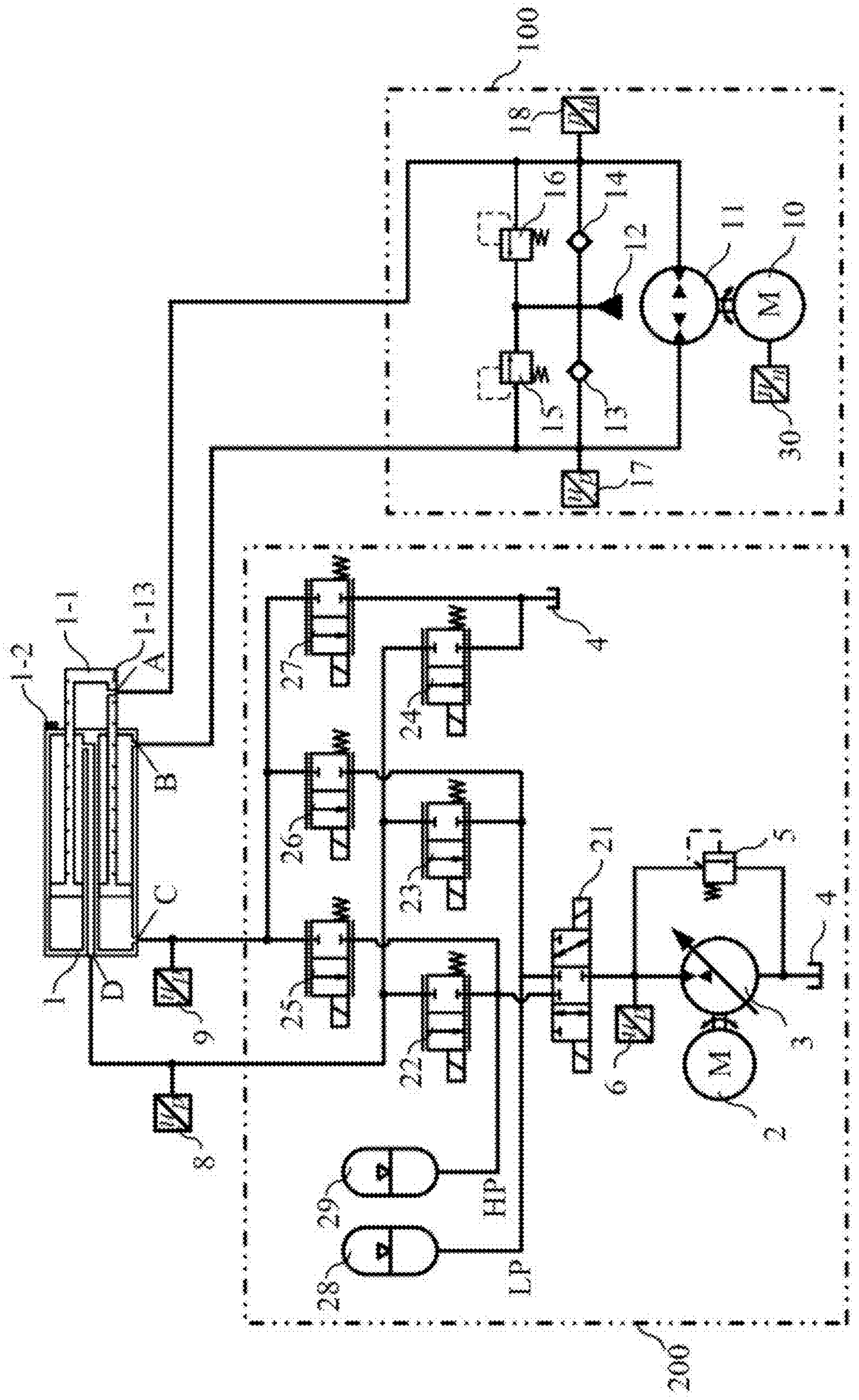
FIG. 3 is a third structural connection diagram of an open and closed circuit parallel drive system based on a four-chamber hydraulic cylinder according to an embodiment of the present application.

As a third alternative embodiment, as shown in FIG. 3, when the open valve-controlled drive unit 200 is a multi-stage pressure drive unit, the valve-controlled module specifically includes: a reversing valve 21, a first proportional throttle valve 22, a second proportional throttle valve 23, a third proportional throttle valve 24, a fourth proportional throttle valve 25, a fifth proportional throttle valve 26, a sixth proportional throttle valve 27, a first hydraulic accumulator 28 and a second hydraulic accumulator 29.

The first oil port of the reversing valve 21 is connected to the oil outlet of the driving module, the second oil port of the reversing valve 21 is connected to the oil port of the second hydraulic accumulator 29, the first oil port of the first proportional throttle valve 22 and the first oil port of the fourth proportional throttle valve 25 respectively, and the third oil port of the reversing valve 21 is connected to the oil port of the first hydraulic accumulator 28, the first oil port of the second proportional throttle valve 23 and the first oil port of the fifth proportional throttle valve 26 respectively; the pressure of the second hydraulic accumulator 29 is greater than the pressure of the first hydraulic accumulator 28; the first hydraulic accumulator 28 is a low-pressure accumulator, and the second hydraulic accumulator 29 is a high-pressure accumulator.

The first oil port of the third proportional throttle valve 24 and the first oil port of the sixth proportional throttle valve 27 are both connected to the oil reservoir 4; the second oil port of the third proportional throttle valve 24 is connected to the oil port D of the four-chamber hydraulic cylinder of the four-chamber hydraulic cylinder 1, the second oil port of the first proportional throttle valve 22 and the second oil port of the second proportional throttle valve 23 respectively.

The second oil port of the sixth proportional throttle valve 27 is connected to the oil port C of the four-chamber hydraulic cylinder of the four-chamber hydraulic cylinder 1, the second oil port of the fourth proportional throttle valve 25 and the second oil port of the fifth proportional throttle valve 26 respectively.

In real application, the number of proportional throttle valves and hydraulic accumulators can be adjusted to adjust the pipeline pressure in stages according to real conditions.

Alternatively, the system further includes a second pressure sensor 8 and a third pressure sensor 9, wherein the detection end of the second pressure sensor 8 is connected to the oil port D of the four-chamber pressure cylinder 1, and the detection end of the third pressure sensor 9 is connected to the oil port C of the four-chamber pressure cylinder.

Embodiment 2

The present application also provides a control method for open and closed circuit parallel drive, the method utilizes the above system, and the method includes:

- providing a first load power through the open valve-controlled driving unit 200.
- providing a second load power and controlling the operating velocity and displacement of the four-chamber hydraulic cylinder 1 through the closed pump-controlled drive unit 100.

the first load power is greater than the second load power.

The specific method for controlling the operating velocity and displacement of the four-chamber hydraulic cylinder 1 is as follows:

- when the four-chamber hydraulic cylinder 1 overcomes an external load and extends, based on the preset velocity and displacement, adjusting the velocity of the second power source 10 by open-circuit or closed-circuit control manner to control the velocity and displacement of the four-chamber hydraulic cylinder 1; adjusting the pressure of the third chamber 1-7 of the four-chamber hydraulic cylinder 1 through the valve-controlled module of the open valve-controlled drive unit 200 to prevent the second power source 10 from being overloaded.

When the four-chamber hydraulic cylinder 1 overcomes an external load and retracts, based on the preset velocity and displacement, adjusting the velocity of the second power source 10 by open-circuit or closed-circuit control manner to control the velocity and displacement of the four-chamber hydraulic cylinder 1; adjusting the pressure of the fourth chamber 1-8 of the four-chamber hydraulic cylinder 1 through the valve-controlled module of the open valve-controlled drive unit 200 to prevent the second power source 10 from being overloaded.

When the four-chamber hydraulic cylinder 1 is extended under the action of an external load, based on the preset velocity and displacement, controlling the velocity and displacement of the four-chamber hydraulic cylinder 1 by adjusting the rotation velocity of the second power source 10; the second power source 10 is in a power generation state, converting the kinetic and potential energy of the four-chamber hydraulic cylinder 1 into electrical energy for recovery; adjusting the pressure of the fourth chamber 1-8 of the four-chamber hydraulic cylinder 1 by the valve-controlled module of the open valve-controlled drive unit 200 to prevent the second power source 10 from being overloaded.

When the four-chamber hydraulic cylinder 1 retracts under the action of an external load, based on the preset velocity and displacement; controlling the velocity and displacement of the four-chamber hydraulic cylinder 1 by adjusting the rotation velocity of the second power source 10; the second power source 10 is in a power generation state, converting the kinetic and potential energy of the four-chamber hydraulic cylinder 1 into electrical energy for recovery; the pressure of the third chamber 1-7 of the four-chamber hydraulic cylinder 1 is adjusted by the valve-controlled module of the open valve-controlled drive unit 200 to prevent the second power source 10 from being overloaded.

The working torque of the second power source 10 is less than or equal to the rated torque.

In addition, during the operation of the four-chamber hydraulic cylinder 1, each time the magneto-electric induction mark point 1-9 passes through the position sensing device 1-2, the position sensing device 1-2 detects a change of the magnetic field at the annular groove of the piston rod 1-1 and sends out a pulse signal. By counting the pulse signals during operation and multiplying them by the machining interval of the magneto-electric induction mark point 1-9, the actual position of the piston rod 1-1 can be obtained. Further, the rotation velocity of the second power source 10 is adjusted by the deviation between the theoretical position and the actual position of the piston rod 1-1, without the need for expensive velocity/position sensors, which can effectively improve the velocity and position control accuracy of the four-chamber hydraulic cylinder 1. The position detection method can be external detection by a displacement sensor or internal detection by a built-in displacement sensor.

The present application drives the four-chamber hydraulic cylinder with a large load power through an open valve-controlled drive unit, and drives and controls the operating velocity and displacement of the four-chamber hydraulic cylinder with a small load power through a closed pump-controlled drive unit, thereby improving the linearity and stability of the four-chamber hydraulic cylinder control and reducing the system installed power and throttling loss. The present application uses an open valve-controlled and a closed pump-controlled drive unit to drive a large power load in parallel, which can realize the decoupling of the actuator motion control and the power output. The closed pump-controlled unit controls the actuator motion, which can not only reduces the throttling loss of the system, but also electrically recycle the energy of the actuator in the overrunning condition, realizing the integration of drive and kinetic-potential energy recovery; the open valve-controlled drive unit matches the external load acting on the actuator in real time, further reducing the throttling loss of the system, and suppressing the interference of the external load on the closed pump-controlled system meanwhile, so that the actuator system has higher motion control accuracy and operating stability, and uses a smaller closed pump-controlled drive unit to highly dynamically control the four-quadrant operation of a large inertia load. Compared with the traditional valve-controlled single-rod hydraulic cylinder system, the present application can effectively reduce the throttling loss of the system and improve the linearity and stability in the process of hydraulic cylinder velocity and position control; moreover, the present application provides most of the load power through an open valve-controlled drive unit, and the closed pump-controlled drive unit controls the velocity and displacement of the four-chamber hydraulic cylinder, which can effectively reduce the installed power of the system compared with the traditional pump-controlled hydraulic cylinder system; through the reasonable design of the four-chamber hydraulic cylinder, it can ensure that the effective areas of the two working chambers connected to the closed pump-controlled drive system are equal, and there is no need for a complex oil replenishment system to compensate for the asymmetric flow caused by the area difference, thereby simplifying the system structure.

The technical features of the above embodiments may be combined arbitrarily. To make the description concise, not all possible combinations of the technical features in the above embodiments are described. However, as long as the combinations of these technical features have no contradictions among them, they should be considered to be within the scope of this specification.

The present specification uses specific embodiments to describe the principles and implementation methods of the present application. The description of the above embodiments is only used to help understand the method and core concept of the present application. At the same time, for those skilled in the art, according to the concept of the present application, there will be modifications in terms of specific implementation methods and application scope. In summary, the content of this specification should not be construed as limiting the present application.

What is claimed is:

1. An open circuit and closed circuit parallel drive system for a four-chamber hydraulic cylinder, comprising the four-chamber hydraulic cylinder and a hydraulic control system, wherein the hydraulic control system comprises a closed circuit pump-controlled drive unit and an open circuit valve-controlled drive unit, wherein a first oil port of the closed circuit pump-controlled drive unit is connected to a second oil port of the four-chamber hydraulic cylinder, and a second oil port of the closed circuit pump-controlled drive unit is connected to a first oil port of the four-chamber hydraulic cylinder; and the closed circuit pump-controlled drive unit is configured to drive and control an operating velocity and displacement of the four-chamber hydraulic cylinder with a first load power; and a first oil port of the open circuit valve-controlled drive unit is connected to a fourth oil port of the four-chamber hydraulic cylinder, and a second oil port of the open circuit valve-controlled drive unit is connected to a third oil port of the four-chamber hydraulic cylinder; the open circuit valve-controlled drive unit is configured to drive the four-chamber hydraulic cylinder with a second load power; and the second load power is greater than the first load power.

2. The open circuit and closed circuit parallel drive system for the four-chamber hydraulic cylinder according to claim 1, wherein the closed circuit pump-controlled drive unit comprises: a second power source, a second hydraulic pump motor, an oil source, a first check valve, a second check valve, a first relief valve, and a second relief valve, wherein an oil outlet of the first check valve is connected to the second oil port of the four-chamber hydraulic cylinder and a first oil port of the second hydraulic pump motor respectively, and an oil inlet of the first check valve is connected to the oil source and an oil inlet of the second check valve respectively;

an oil outlet of the second check valve is connected to the first oil port of the four-chamber hydraulic cylinder and a second oil port of the second hydraulic pump motor respectively;

the second hydraulic pump motor is connected to a shaft of the second power source;

an oil inlet of the first relief valve is connected to the second oil port of the four-chamber hydraulic cylinder, and an oil outlet of the first relief valve is connected to an oil outlet of the second relief valve and the oil source respectively; and an oil inlet of the second relief valve is connected to the first oil port of the four-chamber hydraulic cylinder.

3. The open circuit and closed circuit parallel drive system for the four-chamber hydraulic cylinder according to claim 2, wherein the closed circuit pump-controlled drive unit further comprises: a fourth pressure sensor and a fifth pressure sensor, wherein a detection end of the fourth pressure sensor is disposed on a first oil circuit, wherein the oil outlet of the first check valve is located in first oil circuit; and a detection end of the fifth pressure sensor is disposed on a second oil circuit, wherein the oil outlet of the second check valve is located in the second oil circuit.

4. The open circuit and closed circuit parallel drive system for the four-chamber hydraulic cylinder according to claim 2, wherein the second hydraulic pump motor is a fixed-displacement closed circuit hydraulic pump motor or a variable-displacement closed circuit hydraulic pump motor; the second power source is a servo motor, a stepper motor, a DC motor, or a switched reluctance motor; a first hydraulic pump motor is a constant pressure pump, a load-sensitive pump, a constant-power variable pump, or an electric proportional displacement pump; and a first power source is an electric motor, a diesel engine, or a gasoline engine.

5. A control method for an open circuit and closed circuit parallel drive system for a four-chamber hydraulic cylinder, wherein the control method utilizes the open circuit and closed circuit parallel drive system for the four-chamber hydraulic cylinder according to claim 2, and the control method comprises:

providing the first load power and controlling the operating velocity and displacement of the four-chamber hydraulic cylinder through the closed circuit pump-controlled drive unit; and providing the second load power through the open circuit valve-controlled drive unit;

wherein the second load power is greater than the first load power;

wherein a method for controlling the operating velocity and displacement of the four-chamber hydraulic cylinder comprises:

when the four-chamber hydraulic cylinder overcomes an external load and extends, based on a preset velocity and displacement, adjusting a rotation velocity of the second power source to control the operating velocity and displacement of the four-chamber hydraulic cylinder; and adjusting a pressure of a third chamber of the four-chamber hydraulic cylinder through a valve-controlled module of the open circuit valve-controlled drive unit to prevent the second power source from being overloaded;

when the four-chamber hydraulic cylinder overcomes the external load and retracts, based on the preset velocity and displacement, adjusting the rotation velocity of the second power source to control the operating velocity and displacement of the four-chamber hydraulic cylinder; and adjusting a pressure of a fourth chamber of the four-chamber hydraulic cylinder by the valve-controlled module of the open circuit valve-controlled drive unit to prevent the second power source from being overloaded;

when the four-chamber hydraulic cylinder extends under an action of the external load, based on the preset velocity and displacement, controlling the operating velocity and displacement of the four-chamber hydraulic cylinder by adjusting the rotation velocity of the second power source; the second power source being in a power generation state, and converting a kinetic and potential energy of the four-chamber hydraulic cylinder into an electrical energy for recovery; and adjusting the pressure of the fourth chamber of the four-chamber hydraulic cylinder by the valve-controlled module of the open circuit valve-controlled drive unit to prevent the second power source from overloading; and when the four-chamber hydraulic cylinder retracts under the action of the external load, based on the preset velocity and displacement, controlling the operating velocity and displacement of the four-chamber hydraulic cylinder by adjusting the rotation velocity of the second power source; the second power source being in the power generation state, and converting the kinetic and potential energy of the four-chamber hydraulic cylinder into the electrical energy for recovery; and adjusting the pressure of the third chamber of the four-chamber hydraulic cylinder by the valve-controlled module of the open circuit valve-controlled drive unit to prevent the second power source from overloading;

wherein a working torque of the second power source is less than or equal to a rated torque.

6. The open circuit and closed circuit parallel drive system for the four-chamber hydraulic cylinder according to claim 1, wherein the open circuit valve-controlled drive unit comprises a valve-controlled module and a driving module, wherein a first oil port of the valve-controlled module is connected to the fourth oil port of the four-chamber hydraulic cylinder, and a second oil port of the valve-controlled module is connected to the third oil port of the four-chamber hydraulic cylinder; and an oil outlet of the driving module is connected to an oil inlet of the valve-controlled module.

7. The open circuit and closed circuit parallel drive system for the four-chamber hydraulic cylinder according to claim 4, wherein the driving module comprises: a first power source, a first hydraulic pump motor, a third relief valve, an oil reservoir, and a first pressure sensor, wherein the first hydraulic pump motor is connected to a shaft of the first power source;

a first oil port of the first hydraulic pump motor is connected to the oil reservoir, and a second oil port of the first hydraulic pump motor is connected to the oil inlet of the valve-controlled module;

the oil reservoir is connected to an oil return port of the valve-controlled module;

an oil outlet of the third relief valve is connected to the oil reservoir;

an oil inlet of the third relief valve is connected to the second oil port of the first hydraulic pump motor; and a detection end of the first pressure sensor is disposed on an oil circuit, wherein a third oil port of the valve-controlled module is located in the oil circuit.

8. The open circuit and closed circuit parallel drive system for the four-chamber hydraulic cylinder according to claim 5, wherein the valve-controlled module at least comprises: a three-position four-way proportional valve and a first hydraulic accumulator, wherein a first oil port of the three-position four-way proportional valve is connected to the fourth oil port of the four-chamber hydraulic cylinder;

a second oil port of the three-position four-way proportional valve is connected to the third oil port of the four-chamber hydraulic cylinder;

a third oil port of the three-position four-way proportional valve is connected to the oil outlet of the driving module;

a fourth oil port of the three-position four-way proportional valve is connected to the oil reservoir; and the first hydraulic accumulator is disposed between the third oil port of the three-position four-way proportional valve and the oil outlet of the driving module.

9. The open circuit and closed circuit parallel drive system for the four-chamber hydraulic cylinder according to claim 5, wherein the valve-controlled module comprises: a first three-position three-way proportional valve and a second three-position three-way proportional valve, wherein a first oil port of the first three-position three-way proportional valve is connected to the fourth oil port of the four-chamber hydraulic cylinder;

a first oil port of the second three-position three-way proportional valve is connected to the third oil port of the four-chamber hydraulic cylinder;

a second oil port of the first three-position three-way proportional valve and a second oil port of the second three-position three-way proportional valve are connected to the oil outlet of the driving module; and a third oil port of the first three-position three-way proportional valve and a third oil port of the second three-position three-way proportional valve are connected to the oil reservoir.

10. The open circuit and closed circuit parallel drive system for the four-chamber hydraulic cylinder according to claim 5, wherein the valve-controlled module comprises: a reversing valve, a first proportional throttle valve, a second proportional throttle valve, a third proportional throttle valve, a fourth proportional throttle valve, a fifth proportional throttle valve, a sixth proportional throttle valve, a first hydraulic accumulator, and a second hydraulic accumulator, wherein a first oil port of the reversing valve is connected to the oil outlet of the driving module, a second oil port of the reversing valve is connected to an oil port of the second hydraulic accumulator, a first oil port of the first proportional throttle valve and a first oil port of the fourth proportional throttle valve respectively, and a third oil port of the reversing valve is connected to an oil port of the first hydraulic accumulator, a first oil port of the second proportional throttle valve and a first oil port of the fifth proportional throttle valve respectively; and a pressure of the second hydraulic accumulator is greater than a pressure of the first hydraulic accumulator;

a first oil port of the third proportional throttle valve and a first oil port of the sixth proportional throttle valve are connected to the oil reservoir; and a second oil port of the third proportional throttle valve is connected to the fourth oil port of the four-chamber hydraulic cylinder, a second oil port of the first proportional throttle valve and a second oil port of the second proportional throttle valve respectively; and a second oil port of the sixth proportional throttle valve is connected to the third oil port of the four-chamber hydraulic cylinder, a second oil port of the fourth proportional throttle valve and a second oil port of the fifth proportional throttle valve respectively.

* * * * *